Sept. 26, 1933.   W. T. CRESPINEL   1,927,887
GATE FOR MULTIPLE FILMS
Filed Feb. 24, 1930   2 Sheets-Sheet 1

INVENTOR:
William T. Crespinel
By
ATTORNEY.

Sept. 26, 1933.   W. T. CRESPINEL   1,927,887
GATE FOR MULTIPLE FILMS
Filed Feb. 24, 1930    2 Sheets-Sheet 2
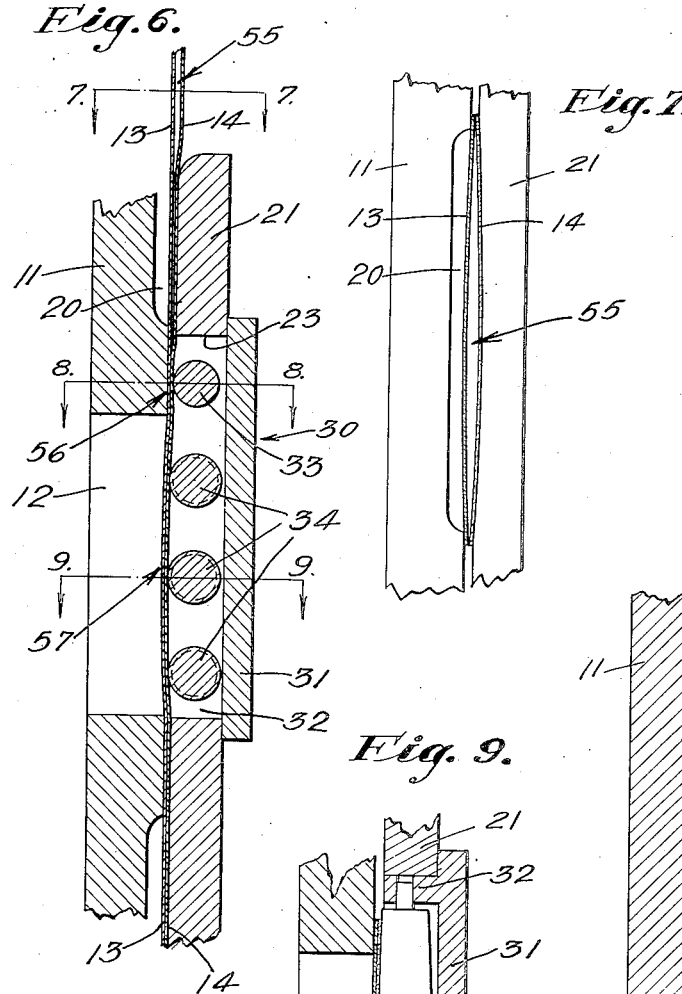
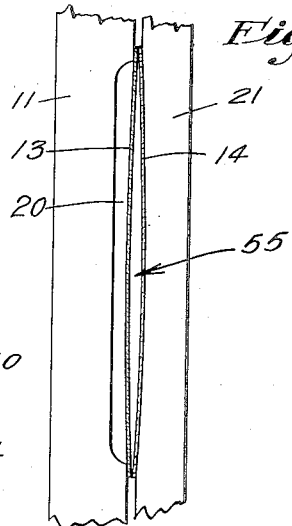
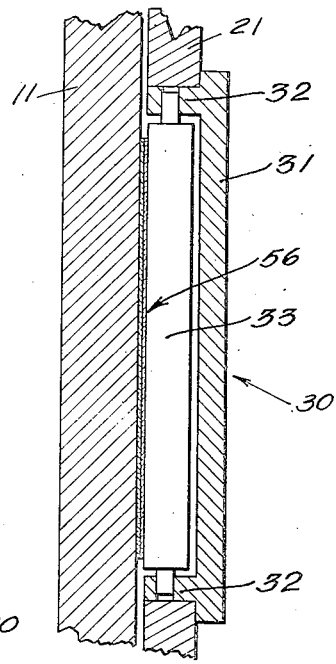
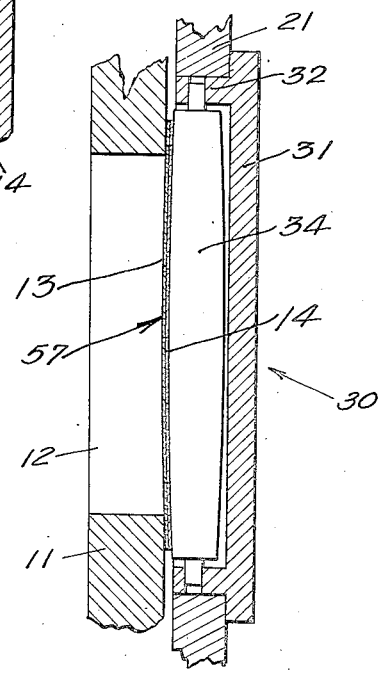
INVENTOR:
William T. Crespinel
By
ATTORNEY.

Patented Sept. 26, 1933

1,927,887

UNITED STATES PATENT OFFICE 1,927,887

GATE FOR MULTIPLE FILMS

William T. Crespinel, Los Angeles, Calif., assignor, by mesne assignments, to Hughes Industries Co. Ltd., a corporation of Delaware Application February 24, 1930. Serial No. 430,640

11 Claims. (Cl. 88—17)

My invention relates to a device for carrying a plurality of superimposed films past an exposure aperture whereat undeveloped films are subjected to light for the purpose of impressing an image thereon or for the purpose of impressing the image of a developed film on an undeveloped film.

My invention has its principal use in color photography for motion pictures in which superimposed films are carried through a camera, these films being so treated that different color values of the image are impressed on separate films simultaneously, but the invention is also of great value in other types of apparatus for exposing superimposed films, an example of such apparatus being a film printer wherein unexposed positive films are printed from a developed negative.

I have found that if clear cut images are to be obtained, a plurality of films should be held positively and firmly in face to face engagement so that practically no air space will exist between the films and that such air space as may exist therebetween will be maintained at a minimum. When two films are run through a motion picture camera gate with their emulsion coatings face to face, the surface of the emulsion of the rear film must be in absolute contact with the emulsion of the front film. Should an air space exist between the two emulsion surfaces, a pronounced lack of sharpness will be found in the image of the rear film. It is an object of this invention to provide a film gate which will hold the separate film members closely together so that maximum sharpness of image will be preserved in the rear film.

Owing to the emulsion coating thereon, a single coated film warps or curves across its width in such a manner as to be concave on its emulsion side. This naturally produces a tendency to hold the center portion of the single coated film away from the surface of the film run therewith through the camera gate. My invention has for an object to provide a simple and effective means for overcoming this natural tendency toward the forming of an air space between superimposed films without placing undue friction on the films, thus giving the desired effect of holding the films tightly together without danger of injury thereto.

It is a further object of the invention to provide in a film gate a plurality of rollers which hold the superimposed films tightly together during the time they pass the exposure aperture of the film gate, and it is also an object of the invention to provide these rollers with crowned surfaces so that a slight excess of pressure is accomplished in the center of the films to slightly curve one of the films to conform to the curvature of the other.

It is likewise an object to provide a method of causing the emulsions of the films to contact, by curving one film to the curvature of the other.

A further object of the invention is to provide in a film gate a removable and adjustable backing member having an upper or entrance roller of true cylindrical form followed by a plurality of crowned rollers so that possibility of injury to the film as it enters the exposure area of the film gate is avoided.

Further objects and advantages of the invention will be made evident throughout the following part of the specification.

Referring to the drawings which are for illustrative purposes only,

Fig. 6 is a greatly enlarged diagrammatic view comparable to the leftward portion of Fig. 1 and illustrating how the film gate rollers of the invention cooperate to hold the superimposed films tightly together. The proportions of this view have been somewhat distorted for the sake of clearness.

Figs. 7, 8, and 9 are diagrammatic sectional views, taken on the different planes indicated by the lines 7—7, 8—8, and 9—9 of Fig. 6.

Figure 1:
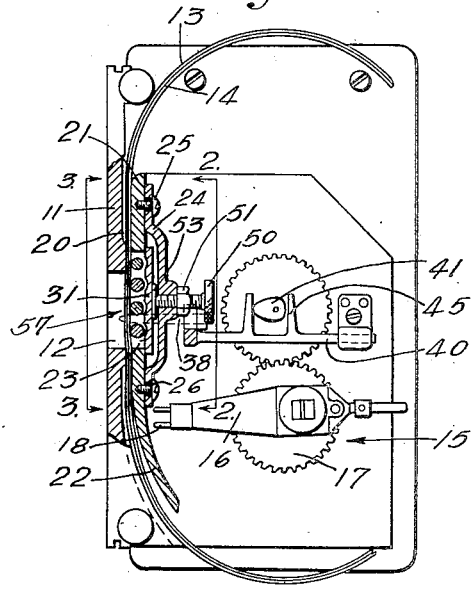
Fig. 1 is a sectional elevational view showing a camera film gate embodying my present invention and showing in simple form a film advancing mechanism which cooperates with the film gate.
Figure 2:
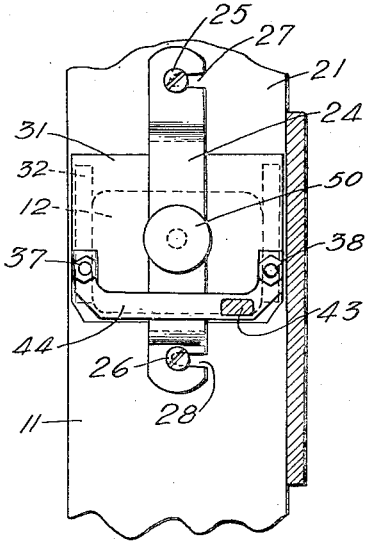
Fig. 2 is an enlarged fragmentary cross section on a plane represented by the line 2—2 of Fig. 1.
Figure 4:
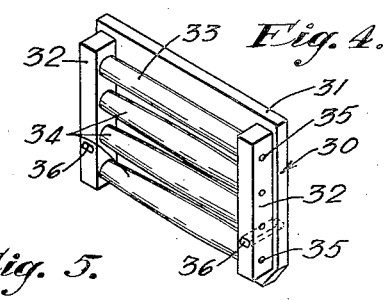
Fig. 4 is a perspective elevational view of the backing member forming part of the film gate.
Figure 3:
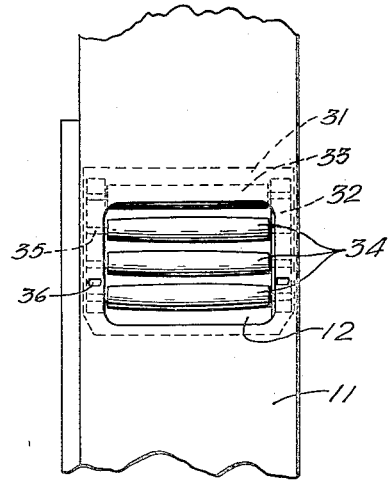
Fig. 3 is an enlarged elevational view derived from Fig. 1 and looking toward the exposure aperture of the film gate, as indcated by the line 3—3 of Fig. 1.

In Fig. 1 I show a simple embodiment of my film gate which may be used in a motion picture camera or in a film printing machine. This film gate has a front wall member 11 with a rectangular exposure aperture 12 therein through which light from a desired source, such as a photographic image, may reach and impress outer and inner films 13 and 14 which are periodically advanced across the exposure aperture 12 by a film advancing mechanism 15 which may be of any of the known types but which herein is shown as including a puller arm 16 actuated through use of a gear 17 in such a manner that the puller pins 18 will engage and remove the films 13 and 14 downwardly through the film gate. The films 13 and 14 are, by the film advancing mechanism 15, caused to travel through a film gate opening or narrow film space 20 which is formed between the front wall member 11 and a rear wall member 21 which curves rearwardly or inwardly at its lower end, as indicated at 22, and which has a rectangular opening 23 therein of greater width than the film exposure aperture 12 and of greater height than the aperture 12. A removable yoke 24 is mounted on the back of the rear wall member 21 by the use of upper and lower screws 25 and 26 placed respectively above and below the opening 23 and adapted to be received in lateral notches 27 and 28 in the upper and lower ends of the yoke 24. Cooperating with the opening 23 and forming part of the rear wall member 21 is a removable backing member 30 which consists, as shown in Fig. 4, of a back plate 31 having vertical ribs or flanges 32 adjacent to the vertical edges thereof and a plurality of rollers 33 and 34 rotatively mounted between the flanges 32, either on shafts which engage openings 35 in the flanges 32 or by the use of pins which project from the ends of the rollers 33 and 34 into the openings 35. The roller 33 is mounted opposite the portion of the wall 11 directly above the opening 12, and the rollers 34 are in back of this opening. At each side of the backing member 30, a registering pin opening 36 is extended through a flange 32, these openings 36 being positioned so as to align with sprocket holes in the edges of the films 13 and 14 and to serve as guides for registering pins 37 and 38 carried on a reciprocating member 40 which is reciprocated by a cam 41 in such timed engagement with the film advancing mechanism 15 that the films 13 and 14 will be engaged by the registering pins 37 and 38 during exposure of the films or during the impression of an image thereon. The reciprocating member 40 includes a bar 43 having a fork 44 at its forward end for holding the registering pins 37 and 38 in proper positions of operation and having projections 45 which extend upwardly so as to cooperate with the cam 41 by which the member 40 is reciprocated.

As shown in Fig. 1, the flanges 32 of the backing member 30 extend into the sides of the opening 23 of the rear wall member 21, and back plate 31 of the member 30 overlaps the edges of the opening 23 in the manner shown. When the backing member 30 is so placed, the rollers 33 and 34 reside within the opening 23 and bear against the back of the inner film 14 so as to hold this inner film 14 in tight engagement with the outer film 13. In order to hold the rollers 33 and 34 against the film 14 with proper pressure, the yoke 24 is equipped with an adjustment screw 50 having a lock nut 51 and being adapted to engage a spring 53 mounted on the back of the back plate 31 of the backing member 30, in the manner shown in Fig. 1. By the use of this construction, the rollers 33 and 34 are resiliently applied to the film 14.

An important feature of the invention is found in the use of the rollers 33 and 34. As previously stated a film bearing an emulsion coating upon one side thereof, has a tendency to warp across its width in such a manner as to be concave on its emulsion side. When two films are placed together with their emulsion coatings face to face this tendency to warp naturally produces an air space between the two films somewhat as indicated at 55 in Figs. 6 and 7. In order to completely expel the quantity of air trapped between the films 13 and 14 previous to their passage before the aperture 12, and also to prevent any possibility of the film being torn as it enters the space between the front wall member 11 and the backing member 30, it is preferable to make the upper roller 33 truly cylindrical in form, which flattens out the films 13 and 14 in the manner shown at 56 in Figs. 6 and 8.

I have found that film while passing through a camera will tend to bulge slightly into the exposure aperture 12 as indicated at 57 in Figs. 6 and 9. It is therefore important to provide the rollers 34 with crowned surfaces or, in other words, rollers which are of larger diameter at the center than at the ends so that a line drawn on the surface of any roller 34 in an axial plane will be convex. Satisfactory results are obtained where the rollers 34 are made .0015 of an inch larger in diameter at their centers than at their ends. As clearly shown in Fig. 9 these crowned rollers 34 will curve the film 14 outwardly into full contact with the film 13, as the films 13 and 14 pass before the exposure aperture 12, so that maximum sharpness of image will be preserved in the rear film 14.

Figure 5:
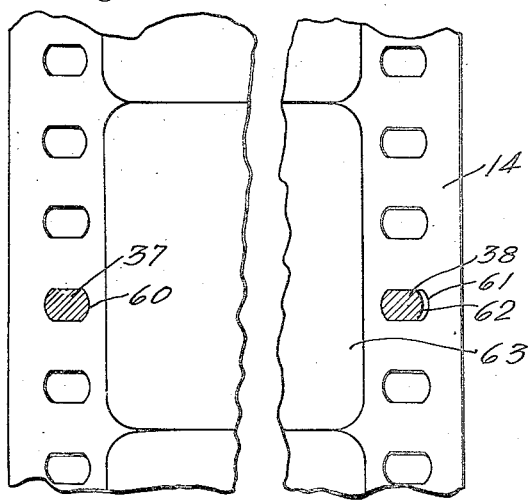
Fig. 5 is an enlarged detail view for showing the manner in which the registering pins of the film gate engage the sprocket perforations of the superimposed films.

In order to insure perfect registering of the films 13 and 14, the registering pins 37 and 38 are made substantially as shown in Fig. 5. The pin 37 is made of such size that it will completely fill a sprocket hole 60, and the pin 38 is made narrower than the sprocket hole 61 into which it projects so that a space, such as indicated at 62, will exist. The pin 38 is of the same vertical height as the opening 61. When the pins are formed in this manner, the pin 37 aligns the frames 63 vertically, and the pin 38 aligns them laterally.

Although I have herein shown a practical and simple form of my invention, it is recognized that certain parts or elements thereof are representative of other parts, elements, or mechanisms which may be employed in substantially the same manner to accomplish substantially the same results; therefore, it is to be understood that the invention is not to be limited to the details disclosed herein but shall have the scope of the following claims.

I claim as my invention:

1. A film gate for use with a plurality of films, including: a front wall member providing an aperture; means for carrying said films across said aperture; and a backing member held against the back film of said films, said backing member comprising an upper cylindrical roller followed by a plurality of crowned rollers, said rollers being rotatable on axes which are lateral relative to the direction of movement of said films, turning in engagement with the back film of said films, and holding said films in close engagement.

2. A film gate for use with a plurality of films, including: a front wall member providing an aperture; means for carrying said films across said aperture; a rear wall member extending across the back film of said films, said rear wall member having an opening therein substantially coinciding with said aperture; a frame adapted to extend into said opening; a plurality of crowned rollers held on the front face of said frame and being adapted to turn in engagement with the back film of said films so as to hold said films in close engagement; and a cylindrical leading roller preceding said crowned rollers.

3. A motion picture camera film gate for use with a plurality of films, including: a front wall member providing an aperture; means for carrying said films across said aperture; and a backing member held against the back film of said films, said backing member having a plurality of crowned rollers opposite said aperture turning in engagement with the back film of said films and holding said films in close engagement.

4. A motion picture camera film gate for use with a plurality of films, including: a front wall member providing an aperture; means for carrying said films across said aperture; a backing member held against the back film of said films, said backing member having a plurality of crowned rollers opposite said aperture turning in engagement with the back film of said films and holding said films in close engagement; and an adjustment member for varying the pressure with which said rollers are applied to said back film of said films.

5. A motion picture camera film gate for use with a plurality of films, including: a front wall member providing an aperture; means for carrying said films across said aperture; a backing member held against the back film of said films, said backing member having a plurality of crowned rollers opposite said aperture turning in engagement with the back film of said films and holding said films in close engagement; and means for resiliently forcing said rollers against said back film of said films.

6. A motion picture camera film gate for use with a plurality of films, including: a front wall member providing an aperture; means for carrying said films across said aperture; a backing member held against the back film of said films, said backing member comprising an upper cylindrical roller followed by a plurality of crowned rollers, said rollers being rotatable on axes which are lateral relative to the direction of movement of said films, turning in engagement with the back film of said films, and holding said films in close engagement; and an adjustment member for varying the pressure with which said rollers are applied to said back film of said films.

7. A motion picture camera film gate for use with a plurality of films, including: a front wall member providing an aperture; means for carrying said films across said aperture; a backing member held against the back film of said films, said backing member comprising an upper cylindrical roller followed by a plurality of crowned rollers, said rollers being rotatable on axes which are lateral relative to the direction of movement of said films, turning in engagement with the back film of said films, and holding said films in close engagement; and means for resiliently forcing said rollers against said back film of said films.

8. A motion picture camera film gate for use with a plurality of films, including: a front wall member providing an aperture; means for carrying said films across said aperture; a rear wall member extending across the back film of said films, said rear wall member having an opening therein substantially coinciding with said aperture; a frame adapted to extend into said opening; and a plurality of crowned rollers held on the front face of said frame positioned abreast of said aperture and being adapted to turn in engagement with the back film of said films so as to hold said films in close engagement.

9. A motion picture camera film gate for use with a plurality of films, including: a front wall member providing an aperture; means for carrying said films across said aperture; a rear wall member extending across the back film of said films, said rear wall member having an opening therein substantially coinciding with said aperture; a frame adapted to extend into said opening; a plurality of crowned rollers held on the front face of said frame positioned abreast of said aperture and being adapted to turn in engagement with the back film of said films so as to hold said films in close engagement; and means for applying pressure to said frame so as to cause said rollers to engage said back film of said films.

10. A motion picture camera film gate for use with a plurality of films, including: a front wall member providing an aperture; means for carrying said films across said aperture; a rear wall member extending across the back film of said films, said rear wall member having an opening therein substantially coinciding with said aperture; a frame adapted to extend into said opening; a plurality of crowned rollers held on the front face of said frame positioned abreast of said aperture and being adapted to turn in engagement with the back film of said films so as to hold said films in close engagement; and means for resiliently applying pressure to said frame so as to cause said rollers to engage said back film of said films.

11. A motion picture camera film gate for use with a plurality of films, including: a front wall member providing an aperture; means for carrying said films across said aperture; a rear wall member extending across the back film of said films, said rear wall member having an opening therein substantially coinciding with said aperture; a frame adapted to extend into said opening; a plurality of crowned rollers held on the front face of said frame and being adapted to turn in engagement with the back film of said films so as to hold said films in close engagement; a cylindrical roller preceding said crowned rollers; and means for resiliently applying pressure to said frame so as to cause said rollers to engage said back film of said films.

WILLIAM T. CRESPINEL.